United States Patent [19]

Chen et al.

[11] Patent Number: 4,849,572
[45] Date of Patent: Jul. 18, 1989

[54] PROCESS FOR PREPARING POLYBUTENES HAVING ENHANCED REACTIVITY USING BORON TRIFLUORIDE CATALYSTS (PT-647)

[75] Inventors: Frank J. Chen, Piscataway, N.J.; Jacob Emert, Brooklyn, N.Y.; Robert D. Lundberg, Bridgewater; Gregory C. Giffin, Martinsville, both of N.J.

[73] Assignee: Exxon Chemical Patents Inc., Linden, N.J.

[21] Appl. No.: 136,867

[22] Filed: Dec. 22, 1987

[51] Int. Cl.[4] .............................................. C07C 2/02
[52] U.S. Cl. .................................................... 585/525
[58] Field of Search ......................................... 585/525

[56] References Cited

U.S. PATENT DOCUMENTS

| | | | |
|---|---|---|---|
| 4,420,647 | 12/1983 | Hammond et al. | 585/525 |
| 4,434,309 | 2/1984 | Larkin et al. | 585/525 |
| 4,490,571 | 12/1984 | O'Hara et al. | 585/525 |
| 4,587,368 | 5/1986 | Pratt | 585/525 |

Primary Examiner—Curtis R. Davis
Attorney, Agent, or Firm—J. B. Murray, Jr.; M. B. Kapustij

[57] ABSTRACT

There is provided a process for preparing polybutenes having enhanced reactivity using a BF$_3$ catalyst and an immediate quench procedure and controlled polymerization times of 12 to 40 minutes in combination with isobutylene conversions of at least 70%.

30 Claims, 2 Drawing Sheets

PROCESS FOR PREPARING POLYBUTENES HAVING ENHANCED REACTIVITY USING BORON TRIFLUORIDE CATALYSTS (PT-647)

BACKGROUND OF THE INVENTION

The present invention is directed to a process for the cationic polymerization of butenes to prepare viscous polybutenes in the number average molecular weight ($\overline{M}_n$) range of from about 300 to about 5,000 having enhanced addition reactivity with unsaturated intramolecular anhydrides such as maleic anhydride.

Viscous polybutenes possessing the above described molecular weights have viscosities in the range of about 4 to about 40,000 centistokes at 100° C. Such polybutenes are commercially available from polymerization of refinery butenes, e.g., isobutylene, cis-butene-2 and butene-1 generally present with butane in a $C_4$ fraction. Commercially since about 1940, such $C_4$ fractions with or without added isobutylene, or isobutylene rich concentrates typically have been polymerized in the presence of Friedel-Crafts catalysts, such as aluminum halides, ferric halides, zinc halides, boron halides (i.e., BF3), tin halides, mecuric halides, and titanium halides.

The wide range in viscosity and in the molecular weight depends, as is known, on polymerization temperature, catalyst and its concentration, and on the olefin content of the feed.

The viscous polybutenes are essentially water white and thermally decompose with no residue at temperatures above 275° C., and have some use applications in engine oils as anti-scuff agents and viscosity index improvers and in fuels for internal combustion engines to reduce or suppress deposits in the fuel induction system. The viscous polybutenes have also found use as components of caulking compounds, adhesives and electric-cable insulating oils.

However, the greatest use of the viscous polybutenes has been as a raw material in the manufacture of addition agents for lubricating oils, fuels and gasoline, because the viscous polybutenes are reactive olefins and impart a branched-chain alkyl structure to derivatives thereof, enhancing their solubility in petroleum products such as lubricant oils, fuels, and refinery streams.

The derivatives of most interest in the past 15 years are the polybutenyl-substituted saturated intramolecular anhydrides of aliphatic dicarboxylic acids, such as succinic anhydride. The derivatives are synthesized by reacting a polybutene with an unsaturated intramolecular anhydride. Thus, polybutenyl substituted succinic anhydride (also referred to herein as PIBSA) is obtained by reaction of the polybutene with maleic anhydride. The polybutenyl-substituted saturated aliphatic anhydrides have been used per se, or as intermediates in the synthesis of diester amide, imide, amidine, and imidine, addition agents in petroleum products. Such addition agents when derived from polybutenes of 500 to about 5,000 $\overline{M}_n$ have found extensive use as detergent-dispersants in motor oils and lesser use as carburetor detergents in gasoline, heat exchanger antifoulants in refinery streams, rust and corrosion inhibitors in surface coatings, and as emulsifiers and demulsifiers.

The synthesis of these latter nitrogen containing addition agents, however, proceeds through the carboxyl groups of the anhydride (see for example U.S. Pat. No. 3,131,150). Consequently, in many instances, the usefulness of polybutenes for the synthesis of said addition agents is directly related to the ability of the polybutene to react with the unsaturated anhydride, thereby functionalizing the polybutene with reactive carboxyl groups. Unreacted polybutene by-product associated with the production of the polybutenyl-substituted saturated anhydride is considered inert relative to reactions conducted with, and proceeding through, the carboxyl groups of the polybutenyl-substituted anhydride in the formation of said addition agents.

Accordingly, while such unreacted polybutene does not have to be removed after the polybutenylsubstituted saturated anhydride synthesis, it decreases the amount of active ingredient of the addition agent, on a weight percent basis, ultimately formed from the substituted-anhydride when it is not so removed, thereby requiring more of the mixture of unreacted polybutene and active ingredient to produce a given effect.

As indicated above, a prime utility of the polybutenes discussed herein is as a starting material in the synthesis of polyisobutenyl succinic anhydride (PIBSA) intermediates. There are a variety of methods which can be employed in the synthesis of PIBSA from maleic anhydride and polybutene, said polybutene also being referred to herein as polyisobutylene (PIB) because of the high isobutylene content present therein. Consequently, the following discussion attempts to illustrate the importance of PIB reactivity in the context of these methods.

As is well known in the art, two principle routes exist for the preparation of PIBSA using PIB having the molecular weights ($\overline{M}_n$) described herein, namely, a one step method and a two step method.

The one step method involves the direct reaction of maleic anhydride and PIB in a single stage. The one step method can be further subdivided into processes involving the presence of chlorine and those involving the absence of chlorine.

When the one step method is conducted in the absence of chlorine, a mixture of molten maleic anhydride and polyisobutylene is heated to produce PIBSA directly. The resulting product is commonly called thermal-PIBSA or T-PIBSA and is also referred to herein as conventional PIB.

In the alternative one step method, molten maleic anhydride and polyisobutylene are mixed together, gaseous chlorine is added to the mixture, and the mixture heated and reacted to form PIBSA. This method is disclosed in U.S. Pat. No. 3,215,707. The chlorine reacts with the PIB in situ and the chlorinated PIB more readily reacts with maleic anhydride also present in situ, than unchlorinated PIB. This embodiment of the one step method requires approximately equi-molar amounts of maleic anhydride and chlorine in the reaction mixture.

The two step method is conducted by reacting polyisobutylene with chlorine in a first step to produce a chlorinated polymer commonly called chloro-PIB (Cl-PIB). The Cl-PIB is then reacted with maleic anhydride to form a product known as chloro-PIBSA or Cl-PIBSA. This method is described in U.S. Pat. No. 4,234,435.

The chlorinated one and two step methods were developed as a means for achieving higher yields of PIBSA due to the low reactivity of conventional PIB with maleic anhydride in the thermal route. However, the use of chlorine is associated with disadvantages in that chlorine is a toxic gas which produces HCl that must be neutralized with large amounts of caustic before disposal. This increases the cost of the process and necessitates the use of additional equipment to ensure saftey and comply with environmental regulations. The chlorine based processes are advantageous in that the initial reactivity of the PIB with maleic anhydride is not a prime consideration. This stems from the fact that the chlorinated PIB formed in either the appropriate one or two step methods is so much more reactive than conventional PIB that the initial reactivity of the latter becomes essentially irrelevant to the ultimate yield of PIBSA. However, this effect is not achieved without the use of high amounts of chlorine sufficient to permit all the PIB molecules to be chlorinated. It is the very use of high amounts of chlorine, however, which gives rise to the disadvantages of the chlorinated routes to PIBSA.

The initial reactivity of the PIB is extremely important, however, for the formation of thermal PIBSA which does not involve chlorine. Moreover, it is the absence of chlorine which makes the thermal-PIBSA route extremely attractive from an economic and environmental standpoint.

Thus, economics and the current regulatory environment constitute prime motivations for improving the reactivity of polybutenes to enable them to be used more efficiently in the thermal-PIBSA route.

In view of the above, there has been a continuing search for processes which enable the production of polybutenes having enhanced reactivity with said unsaturated intramolecular anhydrides. The present invention was developed as a result of this search.

Enhanced reactivity is imparted to polybutenes in accordance with the present invention by process steps which increase the proportion of reactive double bond types present therein that facilitate the desired reactions sought to be subsequently induced.

More specifically, viscous polybutenes are complex mixtures of polymers, and copolymers of, inter alia, isobutylene, cis-butene-2 and butene-1. The nature and relative amounts of the butene monomers involved in the polymerization leading to a particular $\overline{M}_n$ polybutene are not indicative of the resulting polymer product because extensive isomerization occurs during polymerization and because of the differences in reactivities of the individual monomers.

The non-olefinic chain portion of the polybutene molecules is composed of normal butyl and isobutyl monomer units and hence is a long branched alkyl chain.

The heavier polybutenes (e.g., 500 to 5,000 $\overline{M}_n$) contain a majority of isobutylene units.

As is well known in the art, double bond types can be classified according to the number of hydrocarbon

| Monosubstituted (vinyl) | $R-CH=CH_2$ | (i) |

Disubstituted (1,1-disubstituted)

or

-continued $R-CH=CHR^1$ (iii)

Trisubstituted

(iv)

Tetrasubstituted (v)

wherein R, $R^1$, $R^2$ and $R^3$ are hydrocarbyl groups.

In polybutene molecules, the disubstituted double bond can be terminal as represented by the formula:

(vi)

terminal disubstituted or internal as represented by the formula:

(vii)

internal disubstituted wherein R and $R^1$ represent hydrocarbyl groups.

In polybutene molecules, trisubstituted double bonds can be viewed as being terminal with reference to the polymer chain as represented by the formula:

(viii)

terminal trisubstituted or internal as represented by the formula:

(ix)

internal trisubstituted wherein R and $R^1$ are as described above, although it is more conventional from the standpoint of nomenclature to treat all trisbustitued double species as internal. Consequently, while one does not normally distinguish trisbustituted double bonds as being internal or terminal strictly on a nomenclature basis, such distinctions are useful because of the difference in reactivity associated with these types of double bonds.

A tetrasubstituted double bond in polybutene molecules can be represented by the formula:

(x)

wherein R, $R^1$, $R^2$, and $R^3$ are hydrocarbyl groups.

Normally one does not detect the presence of monosubstituted double bonds in polybutene molecules.

Various analytical methods are employed to identify the proportion and nature of the polybutene double bond types. Such analytical methods area subject to certain limitations.

For example, conventional IR analysis is capable of easily distinguishing between disubstituted and trisubstituted double bonds and the proportions of each type in a polybutene sample. However, IR has difficulty by itself in distinguishing between internal and terminal disubstituted double bond types. Conventional IR techniques cannot detect tetrasubstituted double bond types.

The Proton Magnetic Resonance (PMR) analytical technique can provide essentially the same infomation as IR about double bond types, and additionally can distinguish between internal and terminal disubstituted types of double bonds. PMR can provide some information relative to quantifying the amount of internal and terminal disubstituted double bonds based on the principle that signal strength is proportional to the number of magnetic nuclei (See Puskas et al cited and discussed hereinafter). However, PMR is not the method of choice for quantifying the proportion of internal and terminal disubstituted double bonds. PMR cannot detect tetrasubstituted double bond types.

Carbon-13 NMR is the method of choice for quantifying the proportion of internal and terminal disubstituted double bonds. Carbon-13 NMR also can detect and quantify tetrasubstituted double bond types.

If one arranges the double bond types in their order of reactivity, information on the proportion of each double bond type in a polybutene sample in conjunction with the total theoretical unsaturation content allows one to determine the relative reactivity of the polybutene sample based on these proportions.

Thus, with respect to polybutene addition reactivity to maleic anhydride, it is generally accepted that isobutylene double bond types arranged in decreasing order of reactivity are terminal disubstituted, terminal trisubstituted, internal disubstituted, internal trisubstituted, and tetrasubstituted.

Since the terminal disubstituted double bond type is considerably more reactive than the remainder of the other double bond types and the tetrasubstituted double bond type may be considered to be essentially unreactive, the relative proportional distribution of these two double bond types in a polybutene sample permits one to judge whether a particular polybutene sample will be more or less reactive than another sample. The structural analysis method for determining relative reactivity is extremely convenient and allows one to predict reativity without actually having to react the polybutene with unsaturated intramolecular anhydride.

An alternative method for determining the relative propensity of a polybutene sample to react with the unsaturated intramolecular anhydride involves an analysis of the reaction product itself to determine saponification number (Sap. No.) thereof. The Sap. No. is two times the acid number of the sample which is determined by hydrolyzing the anhydride g roups o f the poly-butenyl-substituted intramolecular anhydride to the acid moiety, and the resulting carboxyl groups reacted with KOH. The degree of reaction is then used to calculate the Sap. No.

From the Sap. No., one can mathematically express the moles of unsaturated intramolecular anhydride which reacted as a percent of the total number of moles of said unsaturated anhydride which should have reacted to form the number of moles of polybutenylsubstituted saturated intramolecular anhydride product present in a 1 g. sample of pure product as follows:

$$\% R = \frac{[\overline{M}_n + A](Sap.\ No.)}{(56.1)(2)(1000)} \times 100 \quad \text{(Eq. I)}$$

wherein
R = Reactivity
$\overline{M}_n$ = Polybutene number average molecular weight as determined by vapor phase osmometry.
A = Mol. wt. of the unsaturated intramolecular anhydride.
56.1 = Mol. wt. of KOH.
2 = The number of carboxyl functional groups reacted with KOH per anhydride moiety.
1000 = Unit conversion.
Sap. No. = In units of mg to g.

When the unsaturated intramolecular is maleic anhydride, the formula of Equation I can be simplified as follows:

$$\% R = \frac{[\overline{M}_n + 98](Sap.\ No.)}{112,200} \times 100 \quad \text{(Eq. II)}$$

The above Equations I and II make the assumption that no more than one molecule of unsaturated anhydride will react with one molecule of polybutene. Since this assumption does not always hold true, it is possible to obtain a percent reactivity in excess of 100%.

Thus, a higher % R value reflects a higher actual polybutene reactivity subject to the below described caveat.

One caveat in using the formulas of Equations I or II is that relative reactivity of two different polybutene samples cannot be determined by this method unless the polybutenyl-substituted saturated intramolecular anhydride forming process conditions which influence reactivity are held constant from one product to another.

For example, in reactions involving polyisobutylene (PIB) and maleic anhydride (MA) to form PIBSA, it can be established that three process conditions will affect the degree of reaction of a given PIB sample with MA, namely, the PIB:MA mole ratio at which the reaction is conducted as well as the PIBSA forming reaction temperature, and reaction time. Moreover, it can also be established that for a given PIB sample: (a) the higher the amount of MA employed, the higher will be the Sap. No. and the higher the (%R) value; (b) the higher the PIBSA forming reaction temperature and/or pressure, the higher will be the Sap. No. and (%R) value; and (c) the longer the PIBSA forming reaction time, the higher will be the Sap. No. and (%R) value.

For the above reasons, it is considered more convenient to characterize polybutene reactivity on a relative basis using structural analysis since this method is independent of the subsequent reaction conditions which are employed to make the PIB-unsaturated anhydride adduct.

It will be understood that an intrinsically more reactive polybutene when reacted with an intramolecular anhydride to form the corresponding adduct (e.g. PIBSA) will produce less unreacted polybutene in the resulting product. The proportion of resulting adduct and unreacted polybutene in the reaction product mixture can be expressed on a weight % basis as % Active Ingredient (A.I.). Thus, for example, a reaction product derived from PIB and maleic anhydride will typically be composed of PIBSA as the active ingredient and unreacted PIB which is essentially an inert diluent with respect to subsequent addition agent formation. Consequently, a reaction product containing 90% A.I. in this context signifies 90 wt. % of the product will be PIBSA and the remaining 10% inactive and composed primarily of unreacted PIB and any solvent. The % A.I. never exceeds 100%.

The addition reaction between the viscous polybutene and intramolecular anhydride of an unsaturated aliphatic dicarboxylic acid can typically use any one or more of maleic anhydride, citaconic anhydride, itaconic anhydride, ethyl maleic anhydride, sulfonated maleic anhydride, and the like although maleic anhydride is preferred. The addition reactions are, in general, conducted at temperatures in the range of 150° C. to 300° C. using polybutene to anhydride molar ratios of reactants in the range of typically from about 1.0:0.8 to about 1.0:5.0; and preferably from about 1.0:1.05 to about 1.0:1.15.

As indicated above, polybutenes are typically prepared using a Friedel-Crafts type catalyst. Recently, there has been a resurgence of interest in the use of a $BF_3$ catalyst which has been recognized as producing a more reactive polybutene than for example $AlCl_3$. This enhanced reactivity has been attributed to an increase in the proportion of terminal disubstituted double bonds induced thereby as described in Nolan et al I, U.S. Pat. No. 3,024,226.

However, it has also been reported that $BF_3$ favors isomerization of the polybutene double bonds to give polymers with less reactive non-terminal double bonds.

For example, Puskas et al. in The Journal of Polymer Science, Symposium No. 56, pp 191-202 (1976) have reviewed the relative effects of catalysts such as boron trifluoride and complexes thereof with cocatalysts such as acetic acid and water.

They concluded that on a quantative basis, terminal disubstituted (i.e. vinyldiene) double bonds formed initially diminish under the influence of the $BF_3$ catalyst. This conclusion was drawn from a series of experiments conducted at 5° C. in a batch reactor wherein isobutylene was polymerized with $BF_3$, $BF_3$.AcOH and $BF_3$.$H_2O$ catalysts. The amount of catalyst employed in each run was never specified. Each experiment was conducted in two stages. In the first stage, the reaction was conducted for 5 to 7 minutes, samples withdrawn, quenched, and analyzed. The reaction was then allowed to proceed for an additional 75 to 90 minutes and samples were again analyzed. (While no quench was disclosed in the above publication to have been performed on the 75 to 90 minute samples, a transcript of the lecture presented by Puskas et al. on June 22, 1976 based on the aforedescribed paper indicates that the 75 to 90 minute sample was quenched after it was allowed to warm up to room temperature.) The results for these runs appear at page 197, Table 1. In Table 1, Polymer A designated the quenched 5 to 7 minute reaction time sample, and Polymer B designated the final polymer sample after 75 to 90 minutes reaction time.

The data of Table 1 show that quantitatively, the overall theoretical unsaturation content of the PIB and the percentage of PIB trisubstituted double bonds, for the runs employing the unpromoted $BF_3$ catalyst, remained essentially the same for Polymers A and B. However, the total disubstituted double bond content dropped from 30% of the theoretical unsaturation content in Polymer A to 13% in Polymer B. Similar, although less drastic, drops were observed with the promoted catalysts of $BF_3$.AcOH and $BF_3$.$H_2O$. The drop in disubstituted double bond content was attributed by Puskas et al. to the isomerization of the disubstituted double bonds to tetrasubstituted double bonds.

The criticality of a short reaction time in relation to the use of $BF_3$ for polymerizing isobutylene is also disclosed in Boerzel et al, U.S. Pat. No. 4,152,499. In this patent, the mean polymerization time is confined to from 1 to 10 minutes in order to suppress undesired double bond isomerization. An optional quenching procedure is disclosed but no benefit is alleged to be associated therewith. The amount of $BF_3$ employed is characterized as "higher than usual" and varies from 1 to 20 mmoles $BF_3$ per mole of isobutylene in the feed (i.e. 0.12 to 2.5 wt% of isobutylene in the feed). While short reaction times are employed in this patent to enhance reactivity, such reaction times typically are associated with low isobutylene conversions and polybutene yields.

This problem is recognized and discussed in Child et al., U.S. Pat. No. 3,125,612. In this patent reaction times are confined to the range of 45 to 55 minutes. Thus, it is disclosed that the residence time must be sufficiently long to permit efficient catalyst utilization as measured by monomer conversion and at the same time must not be excessively long to prevent undesirable reactions from occurring.

Thus, on the one hand, enhanced reactivity is disclosed in Boerzel et al. to require polymerization times of from 1 to 10 minutes, and on the other hand, polymerization times of not less than 45 minutes are disclosed in Child et al. to achieve high monomer conversions.

Accordingly, it would be highly desirable to not only achieve enhanced reactivity in the polybutene product but to do so while simultaneously achieving high conversions and high catalyst utilization. $BF_3$ catalyst is expensive and it would be extremely beneficial to be able to achieve high conversions, impart high reactivity to the polybutene and still not use excessive amounts of catalyst.

U.S. Pat. No. 4,605,808 discloses the cationic polymerization of 1-olefins such as isobutylenes using at least 8, e.g., 8 to 70, preferably 12 to 20, minute contact times with a preformed $BF_3$ catalyst complex. The preformed catalyst is prepared by reacting $BF_3$ and a $C_1$ to $C_8$ alcohol to form a complex which complex is introduced into the reactor. In Example 1, isobutylene was polymerized for 16 minutes and the reaction terminated by using an excess of 1% acetonitrile in heptane "which was continuously added to the product collection vessels." Thus, while a quenching procedure was employed, the amount of time which elapsed between the exit of the polymer solution from the reactor and the collection of the product is not specified nor is the temperature of the polymer when quenched reported. Moreover, no beneficial effect is disclosed to be associated with quench. As will be discussed hereinafter, the process of the present invention relies on immediate quench of the polymer before the temperature of the same has increased to point at which undesirable side reaction and isomerization occurs.

Webb, U.S. Pat. No. 2,099,090, is directed to the polymerization of isobutylene to make plastic resins of high molecular weight. Based on the discovery that isobutylene polymerization with $BF_3$ is complete within a "few minutes" at −80° F. (−62° C.), whereas normal butylenes polymerize very slowly (Col. 1, Lines 30 et seq.), a quenching procedure is employed at reaction temperature to stop the reaction before the less reactive olefins have a chance to polymerize when the temperature is allowed to rise. This is said to be contrary to conventional practice wherein the product is allowed to warm up to room temperature and the BF$_3$ distilled off. While this patent is directed primarily to high molecular weight polymers, the patent discloses that isobutylene polymers having molecular weights of "several hundred up to 10,000 to 15,000" can be produced (Col. 2, Lines 1 et seq.). The highest molecular weight polymers are produced at the lowest temperatures, e.g., $-80°$ to $-100°$ F. Typical reaction temperatures disclosed vary from $-80°$ to $-40°$ F. (i.e. $-62°$ to $-40°$ C.)(Col. 2, Lines 10 et seq.). The BF$_3$ concentration varies from 0.1 to 0.5% presumably based on the weight of pure isobutylene (Col. 2, Line 16). The specific reaction time illustrated at Col. 3, Line 15 in the example is 10 minutes. Quenching is achieved at reaction temperature with a mixture of ethyl alcohol and water. Thus, polymerization times in excess of 10 minutes are not disclosed nor is the effect of immediate quench on the reactivity of the PIB at reaction times in excess of 10 minutes. The only benefits disclosed to be associated with immediate quench are an increase in SSU viscosity from 242.9 to 245.9 seconds, disappearance of color, and an increase in viscosity index of oil blended with the polybutene.

Quenching is also disclosed in Bannon II, U.S. Pat. No. 2,363,221 at Col. 2, Line 35. However, reaction times are limited to from 0.2 to 0.5 second to produce low molecular weight dimers and trimers of isobutylene. (See also Bannon I, U.S. Pat. No. 2,317,878.)

Hull, U.S. Pat. No. 2,278,445 discloses the polymerization of isobutylene with BF$_3$ at raaction times of 5 to 30 minutes at catalyst amounts of 0.1 to 2%. No quenching procedure is disclosed and BF$_3$ is removed from the polymer by vaporization. In addition, non-volatile BF$_3$ catalyst complexes are eliminated by adding additional isobutylene at temperatures up to 200° F. (93.3° C.)

Russell, U.S. Pat. No. 2,139,038 discloses isobutylene polymerization with BF$_3$ (0.003 to 1% of feed) using a hydrocarbon diluent, and a reaction time of 1 to 10 minutes. Quenching is employed in Example 1 but the conditions thereof are not specified nor is any benefit disclosed to be associated therewith.

To summarize, none of the aforedescribed art discloses the critical combination of catalyst concentrations, rection time, and immediate quench to produce polybutenes at high conversions having high and/or enhanced reactivity relative to polybutenes prepared at process conditions outside these ranges.

SUMMARY OF THE INVENTION

In one aspect of the present invention, there is provided a process for the preparation of a polybutene having a number average molecular weight ($\overline{M}_n$) of from about 500 to about 5,000, a total terminal double bond content of at least 40%, based on the total theoretical unsaturation of the polybutene, said polybutene containing at least 50% by weight isobutylene units based on the polybutene $\overline{M}_n$ which comprises:

(1) contacting a feed comprising at least 10% by weight isobutylene, based on the weight of the feed, with a BF$_3$ catalyst in a manner and under conditions sufficient to cationically polymerize said feed in the liquid phase to form said polybutene, said polymerization being conducted (a) at an average polymerization time of from 12 to about 40 minutes, (b) at a ratio of millimoles of BF$_3$ to moles of isobutylene in the feed of from about 0.1:1 to about 5:1 and (c) to an isobutylene conversion of at least about 70%; and (2) immediately quenching the polybutene product with a quench medium sufficient to deactivate said BF$_3$ catalyst.

DESCRIPTION OF PREFERRED EMBODIMENTS

In accordance with the process of the present invention, a feedstock comprising isobutylene is cationically polymerized in the liquid phase in the presence of a boron trifluoride containing catalyst under critically controlled conditions of average polymerization time, catalyst concentration and reaction temperature sufficient to produce a polybutene having a number average molecular weight in the range of from about 500 to about 5,000, preferably from about 800 to about 3,000, and most preferably from about 900 to about 2500 as determined by vapor phase osmometry. After attaining the target molecular weight and without exceeding the maximum permitted polymerization time, the resulting polybutene is subjected to immediate quench as hereinafter defined.

The feedstock may be pure isobutylene or a mixed C$_4$ hydrocarbon feedstock containing isobutylene, such as a C$_4$ cut resulting from the thermal or catalytic cracking operation of, for example, naphtha. Thus, suitable feedstocks will typically contain at least 10%, and up to 100% isobutylene, by weight, based on the weight of the feed. In addition to isobutylene, conventional C$_4$ cuts suitable for use as a feedstock which are of industrial importance typically will contain between about 10 and 40% butene-1, between about 10 and 40% butene-2, between about 40 and 60% isobutane, between about 4 and 10% n-butane, and up to about 0.5% butadiene, all percentages being by weight based on the feed weight. Feedstocks containing isobutylene may also contain other non-C$_4$ polymerizable olefin monomers in minor amounts, e.g., typically less than about 25%, preferably less than about 10%, and most preferably less than 5%, such as propadiene, propylene and C$_5$ olefins.

The term "polybutene" as employed herein in intended to include not only homopolymers of isobutylene but also copolymers of isobutylene and one or more other C$_4$ polymerizable monomers of conventional C$_4$ cuts as well as non-C$_4$ ethylenically unsaturated olefin monomers containing typically from about 3 to about 6, and preferably from about 3 to about 5 carbon atoms, provided such copolymers contain typically at least 50%, preferably at least 65%, and most preferably at least 80% isobutylene units, by weight, based on the polymer number average molecular weight ($\overline{M}_n$). The substantially selective polymerizability of isobutylene under the conditions specified herein ensures the aforedescribed minimum isobutylene content.

The catalyst employed in the process of the present invention is BF$_3$ in combination with conventional promoters (i.e., co-catalysts) including water, alcohols, carboxylic acids, acid anhydrides, HF, ethers and mixtures thereof.

The alcohols can contain 1 or more hydroxy groups (e.g., 1 to 3) and be straight or branched chain, aliphatic, preferably saturated aliphatic, aromatic, or mixed aliphatic/aromatic containing typically from 1 to 30, preferably 1 to about 20, and most preferably 1 to about 10 carbons.

Likewise the carboxylic acid and/or ether promoters can contain one or more carboxy or ether groups (e.g., 1 to 3) and be halogen substituted or unsubstituted, straight or branched chain, aliphatic (preferably saturated aliphatic), aromatic or mixed aliphatic/aromatic containing typically from about 1 to about 30, preferably 1 to about 20, most preferably 1 to about 10 carbon atoms.

Representative examples of suitable $BF_3$ promoters include $C_1$ to $C_{18}$ alcohols such as methanol, ethanol, the propanols, butanols, acetic acid, trichloro acetic acid, HF, trifluoroacetic acid, diethyl ether, water and mixtures thereof.

The preferred promoters are water and/or methanol.

A promoted catalyst system as employed herein preferably excludes any preformed catalyst complexes of $BF_3$ with said promoters.

The amount of $BF_3$ catalyst employed in the process of the present invention can be controlled in conjunction with the reaction temperature to achieve the target $\overline{M}_n$ of polybutene polymer but is also sought to be minimized to reduce undesired isomerizations believed to be induced thereby. More specifically, it is well known that generally, the lower the $BF_3$ catalyst concentration in the reaction phase, the higher will be the polybutene molecular weight and vice versa. However, the polybutene molecular weight is extremely sensitive to the reaction temperature and the lower the reaction temperature, the higher will be the molecular weight and vice versa. Accordingly, to the extent that plant equipment and economic factors permit, the polybutene number average molecular weight $(\overline{M}_n)$ is preferably controlled through manipulation of the reaction temperature. However, as a matter of convenience and for reasons of inherent limitations in plant design, the temperature control is typically supplemented with control of the catalyst feed rate to fine tune and achieve a particular target polybutene molecular weight. Control of the polybutene molecular weight within defined limits of a selected target molecular weight is particularly important when the polybutene is intended as a starting material in the synthesis of dispersants such as polybutenyl substituted succinimides.

The catalyst amount also affects the conversion of isobutylene and yield of polybutene, with higher amounts of $BF_3$ typically achieving higher conversions and yields. Unfortunately, $BF_3$ is responsible for isomerizations which reduce the reactivity of the polybutene product. Thus, in the process of the present invention, one also seeks to minimize catalyst concentration while compensating for the drop in conversion which would otherwise be induced thereby with longer polymerization times.

In view of the above, the $BF_3$ catalyst will be employed in an amount sufficient to contact the isobutylene in the liquid phase reaction mixture at a ratio of millimoles of $BF_3$ to moles of isobutylene in the feed of typically from about 0.1:1 to about 5:1 (e.g., 0.2:1 to 5:1), and preferably from about 0.3:1 to about 4:1, and most preferably from about 0.5:1 to about 1.3:1.

The molar ratio of $BF_3$ to promoter is typically from about 0.5:1 to about 200:1, and preferably from about 1:1 to about 100:1.

The polymerization reaction is conducted in the liquid phase to induce linear or chain type polymerization in contradistinction to ring or branch formation. Thus, if a feed is used which is gaseous under ambient conditions, it is preferred to control the reaction pressure and/or dissolve the feed in an inert solvent or liquid diluent, in order to maintain the feed in the liquid phase. Typical $C_4$ cuts comprising the feed are liquid under pressure and do not need a solvent or diluent. Typical diluents suitable for use in the process include $C_3$ to $C_6$ alkanes such as propane, butane, pentane, and the like.

Thus, the catalyst is typically introduced into the reactor as gas which is partially or completely dissolved in a pressurized liquid in the reactor. Polymerization pressures can range typically from about 25 to about 500, and preferably from about 100 to about 300, kpa. Promoter is typically introduced to the monomer feed or the reaction mixture in liquid form by a line separate from the $BF_3$ addition line.

The liquid phase reaction mixture temperature is controlled by conventional means to be typically from about $-20°$ to about $+25°$ C., preferably from about $-10°$ to about $+10$ C. The particular reaction temperature is selected to achieve the target molecular weight, and preferably is not allowed to vary more than $\pm 0.5°$ C. from the selected value, while the catalyst and/or promoter feed rate is varied slightly to achieve the desired $\overline{M}_n$ to compensate for variations in monomer distribution in the feed composition.

The combined use of temperature control and catalyst feed rate permits one to achieve polybutenes having a molecular weight distribution (MWD) of typically from about 1.5 to about 2.5, and preferably from about 1.6 to about 2.0.

Preferably, the reactor contents are stirred to achieve even catalyst distribution therein.

The polymerization reaction can be conducted batchwise, semi-continuously or completely continuously in the conventional manner.

A first critical parameter to be employed is the isobutylene conversion. The isobutylene conversion is defined herein to mean the percent of isobutylene fed to the polymerization reactor under polymerizing conditions which is converted to total product. In a continuous polymerization process, the isobutylene conversion can be determined by analyzing the isobutylene in the feed and comparing this value to the isobutylene content of the product stream which is withdrawn from the polymerization reactor. The isobutylene conversion would then be calculated by the expression:

$$\% \text{ conversion} = \frac{\text{(isobutylene feed rate)} - \text{(isobutylene withdrawal rate)}}{\text{isobutylene feed rate}} \times 100$$

wherein the feed rates and withdrawal rates are expressed in consistent units. For a batch reactor, or a semi-continuous reactor, the isobutylene conversion can be similarly calculated from the amount of isobutylene charged and the amount of isobutylene withdrawn from the polymerization reactor.

It has been surprisingly found that the isobutylene conversion must be at least about 70% in order to produce the improved reactive polyisobutylene of this invention. Preferably, the isobutylene conversion is from about 75% to about 99% and more preferably is from about 80% to about 98%.

A second critical process condition to be controlled is the polymerization time. The polymerization time as defined herein is the average residence time an isobutylene species remains in contact with active $BF_3$ catalyst even after incorporation of that species into the polybutene. By "active $BF_3$ catalyst" is meant a catalyst which not only is capable of catalyzing the polymerization reaction (i.e., has not been deactivated by quenching) but also one which is effective during the time frame under consideration, of actively inducing double bond isomerization. Said another way, the polymerization time is the time during which $BF_3$ catalyst in contact with the polymerization reaction mixture is capable of both adding monomer units to the polymer chain and causes significant double bond isomerization within the polymer chain i.e., greater than 10 mole % of the double bonds in the polyisobutylene. The definition of polymerization time is therefore intended to exclude those periods wherein the $BF_3$ catalyst is at a sufficiently low temperature where at double bond isomerization is temporarily suppressed to insignificant levels, i.e. the mole % of double bonds in the polyisobutylene in contact with $BF_3$ prior to quench which undergoes isomerization at such low temperatures is not greater than 10, preferably not greater than 5%. Temperatures at which isomerization suppression occurs is contemplated to be less than $-25°$ C., preferably less than $-30°$ C., and most preferably less than $-35°$ C.

Thus, it is contemplated that polybutene product can be removed from the reactor, cooled to isomerization suppression temperatures for brief periods of typically from about 1 to about 15, preferably from about 1 to about 10, and most preferably from about 1 to about 5 minutes in the transfer lines feeding the product to the immediate quench zone, and that the duration of the polybutene product at the isomerization suppression temperature will not be included in the computation of the polymerization time as defined herein.

In a batch reaction, the reactor is charged at reaction temperature with the feed, catalyst and promoter and the polymerization time measured from contact of the catalyst with the feed to immediate quench subject to the aforedescribed qualifications.

The preferred mode of reaction, however, is on a continuous basis using a continuous flow stirred reactor wherein feed is continuously introduced into the reactor and product continuously removed from the reactor. Typically, the monomer feed rate and product removal rate are set to be essentially constant and equal to accurately control the $\overline{M}_n$ and MWD of the product. In this instance, the polymerization time is typically determined by dividing the volume of material in the reactor system at reaction temperature by the flow rate of the feed in units of volume/time.

Alternatively, the polymerization time can be determined on a weight basis by dividing the weight of material in the reactor at reaction temperature by the flow rate of the feed in units of wt/time.

Similar calculations can be performed for a reaction conducted on an alternative continuous basis configuration wherein the feed, catalyst, and promoter are introduced into a tubular reactor at one end and product removed and quenched at the other end using the volume traversed by the reaction mixture between catalyst addition and quench in the calculation.

In all instances, the above methods of calculation are intended to permit a determination of the contact time of the "active" catalyst with the reaction mixture prior to immediate quench.

In view of the above, average polymerization times can vary from 12 to about 40, preferably from about 15 to about 30 (e.g., about 20 to about 30), and most preferably from about 15 to about 25 minutes.

If the polymerization time is too short (i.e. less than 12 minutes), lower conversion and yields are achieved at the catalyst amounts employed, whereas if the reaction time is too long (i.e. in excess of about 40 minutes), the reactivity of the polybutene begins to decrease to undesirable levels and the production capacity is significantly reduced due to fixed reactor volumes.

The benefits of low $BF_3$ concentrations and polymerization times in excess of 10 minutes in terms of the combination of reactivity, and yield are not achieved unless an immediate quench procedure is employed in combination with an isobutylene conversi-on of at least about 70%.

By immediate quench is meant that the polybutene product, in contact with $BF_3$ catalyst which has attained the target molecular weight within the average polymerization times described hereinabove, is contacted with a quenching medium to deactivate the $BF_3$ catalyst, within said averaoe polymerization time and before the temperature of said product is allowed to exceed about 5, preferably about 2, and most preferably about 1° C. above the highest reaction temperature employed during the reaction. The range of temperatures encompassed by temperatures up to polymerization temperatures and temperatures slightly above reaction temperature as discussed is referred to herein as the immediate quench temperature range. By deactivation of the $BF_3$ catalyst during immediate quench is meant that the $BF_3$ catalyst is rendered incapable of actively inducing isomerization at 21° C.

Thus, most preferably the quench procedure is conducted while the product is at the reaction temperature or lower, although a very slight temperature rise above reaction temperature may be permitted before quenching is commenced.

It has been found that immediate quench at high isobutylene conversions in conjunction with the critical polymerization times employed produces a polybutene having similar or enhanced reactivity, of the type described above, relative to polybutenes produced at shorter reaction times without immediate quench (or at such long reaction times with immediate quench at low conversion), while simultaneously permitting low $BF_3$ concentrations and high yields. The ability to achieve these results has not been recognized by the prior art.

While not wishing to be bound by any particular theory or mechanism, it is believed that immediate quench substantially eliminates the isomerization of the polybutene double bond types to less reactive double bond types which would otherwise occur in the absence of immediate quench relative to a delayed quench. In addition, when employing $C_4$ cuts as the feed, the propensity of the less reactive (and hence unreacted) $C_4$ monomers present in the product, such as 1-butene and 2-butene, to react as the temperature of the polybutene is allowed to rise in accordance with conventional procedures is substantially reduced if not eliminated. These less reactive monomers, if allowed to end cap the polybutene polymers, are believed to also result in a significant reduction in reactivity of the product. Moreover, immediate quench reduces the amount of $\leq C_{24}$ light ends in the product which light ends are typically formed at higher temperatures without immediate quench.

However, as indicated above, it has been surprisingly found that the benefits of immediate quench are only observed at isobutylene conversions of at least about 70%.

The quench materials used to achieve immediate quench are conventional and include the same materials suitable for use as a promoter with the exception that excess quantities are employed in amounts sufficient to deactivate the $BF_3$ catalyst. Thus, while any amount of quenching medium effective to deactivate the $BF_3$ catalyst may be employed, it is contemplated that such effective amount be sufficient to achieve a molar ratio of quench medium to $BF_3$ catalyst of typically from about 2:1 to about 1000:1, preferably from about 25:1 to about 500:1, and most preferably from about 100:1 to about 300:1.

Immediate quench is conducted by introducing the quench medium into the polybutene product, which product is within the immediate quench temperature range just prior to quenching. Typically, the polybutene product is maintained under pressure during the quench sufficient to avoid vaporization of the $BF_3$ catalyst and other components of the mixture. The temperature of the quenching medium is not critical and if at room temperature when added to the polybutene product, it will cause the product to increase in temperature during the quenching procedure. This is expected and does not materially affect the results of the procedure.

In view of the above, it will be apparent that immediate quench has two aspects associated therewith, namely, (1) it must be conducted on a polybutene which is at a temperature within the immediate quench temperature range, and (2) it must occur within the maximum permissible polymerization time of 40 minutes.

Thus, for example, if the target molecular weight is achieved at 30 minutes at an acceptable conersion, it is preferable for best results to immediately quench the product at this point. However, it is also permissible although not desirable to maintain the product within the immediate quench temperature range for an additional period up to 10 minutes, before quench is performed.

It is not permissible to remove the product from the reactor and in transferring it to a quenching vessel, allow its temperature to rise above the immediate quench temperature nor is it permissible to quench beyond the maximum average polymerization time of about 40 minutes.

In a batch system, quench can be performed in the reactor or preferably on the product just after it is withdrawn from the reactor within the constraints imposed by immediate quench. In a continuous system, the quench will typically be performed just after it exits the reactor.

If immediate quench is not performed just after the product exits the reactor, cooling means will typically have to be employed to any transfer lines to avoid impermissible temperature rise thereof. If the polymerization time at the maximum permissible limit of 40 minutes and immediate quench is not performed just after the product leaves the reactor cooling means will have to be employed to the transfer lines to cool the polybutene to isomerization suppression temperatures until immediate quench is performed.

After immediate quench, the polymerization product is typically subjected to conventional finishing steps which include a caustic/$H_2O$ wash to extract catalyst residue, a hydrocarbon/aqueous phase separation step wherein deactivated-and extracted $BF_3$ is isolated in the aqueous phase, and a water washing step to remove residual amounts of neutralized catalyst. The polymer is then typically stripped in a debutanizer to remove unreacted $C_4$ monomers, followed by a further stripping procedure to remove light end polymer (i.e., $\leq C_{24}$ carbon polymer). The stripped polybutene is then typiclly dried by $N_2$.

The process of the present invention is typically conducted to achieve isobutylene conversion in the range of from about 70 up to about 100, preferably from about 75 to about 99, and most preferably from about 80 to about 98%. The associated yields of polybutene product as defined herein vary typically from about 55 to about 100%, preferably from about 80 to about 95%.

The resulting polybutene product as discussed above consists primarily of isobutylene units and hence is also referred to as polyisobutylene (i.e., PIB).

The polybutene product of the present invention is further characterized by the proportionate distribution of terminal disubstituted double bonds and tetrasubstituted double bonds present therein based on the total theoretical unsaturation of the polymer as determined by Carbon-13-Nuclear Magnetic Resonance Spectroscopy (C-13 NMR).

More specifically, the process of the present invention imparts a total terminal double bond content (that is, the sum of the terminal disubstituted, and terminal trisubstituted double bonds) to the polybutene produced thereby of at least 40%, preferably at least about 45%, and most preferably at least about 50%, based on the total theoretical unsaturation of the polybutene. Preferably, the process of this invention imparts a terminal disubstituted double bond content to the polybutene produced thereby of typically at least about 18%, preferably at least about 32%, and most preferably at least about 64%, and a tetrasubstituted double bond content of typically not greater than about 10%, preferably not greater than about 7%, and most preferably not greater than about 4% based on the total theoretical unsaturation of the polymer. Thus, the total terminal double bond content will typically vary from about 40 to 90%, preferably from about 45 to 85%, and most preferably from about 50 to 80%. The terminal disubstituted double bond content will typically vary from about 18 to about 64, preferably from about 32 to about 64%, and the tetrasubstituted double bond content will vary typically from about 0 to about 10, preferably from about 0 to about 7, and most preferably 0 to about 4% based on the total theoretical unsaturation content of the polybutene.

The polybutene produced in accordance with the present invention can be used without further reaction but the advantages of the high reactivity possessed thereby are obtained when the same is reacted with a monounsaturated intramolecular anhydride as described above, such as maleic anhydride, by the thermal route (i.e. in the absence of chlorine) to form a polybutenyl substituted saturated intramolecular anhydride, such as polyisobutenyl succinic anhydride (PIBSA).

Representative examples of monounsaturated intramolecular anhydrides suitable for reaction with the polybutene include maleic anhydride, and $C_1$ to about $C_4$ alkyl substituted maleic anhydride such as methyl maleic anhydride, ethyl maleic anhydride and propyl maleic anhydride.

The reaction of the polybutene and unsaturated intramolecular anhydride to form the corresponding polybutenyl substituted saturated intramolecular anhydride is conducted in accordance with conventional process conditions associated with the thermal route (i.e., direct alkylation). Such conditions are described hereinafter in connection with maleic anhydride (MA) but are also applicable to the use of other unsaturated intramolecular anhydrides.

Accordingly, the reaction between PIB and maleic anhydride is an addition reaction, not a copolymerization reaction, and can proceed at a mole ratio of PIB:MA of typically from about 1 to about 3, preferably from about 1 to about 1.5, and most preferably from about 1 to about 1.1.

The following examples are given as specific illustrations of the claimed invention. It should be understood, however, that the invention is not limited to the specific details set forth in the examples. All parts and percentages in the examples as well as in the remainder of the specification and claims are by weight unless otherwise specified.

Figure 1:
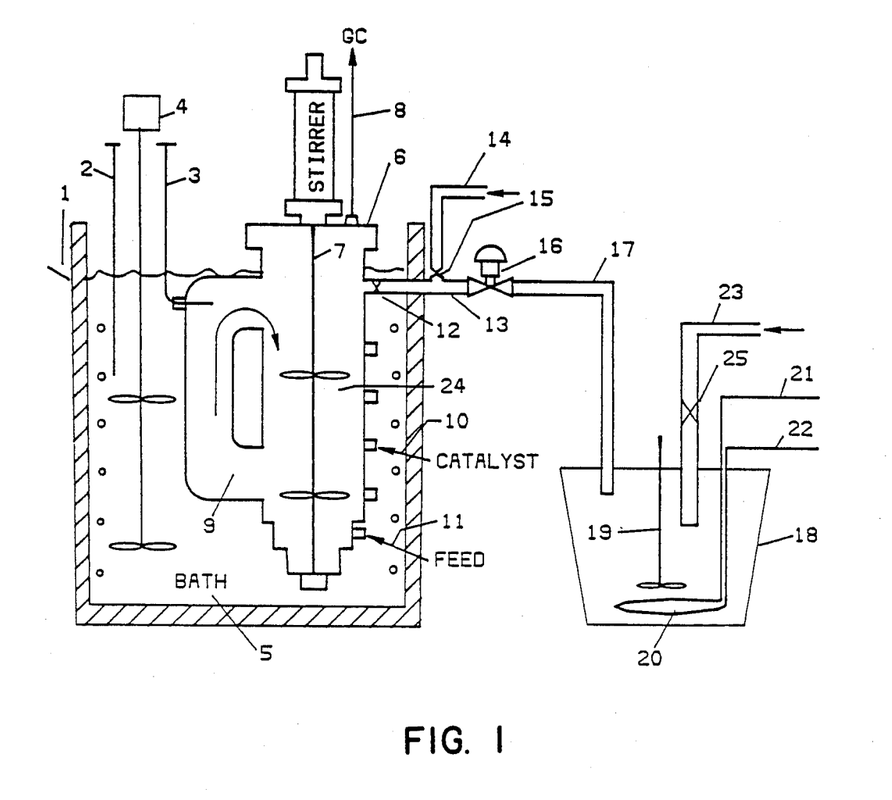
FIG. 1 illustrates a continuous flow stirred reactor configuration described and employed in the Examples.

The following Comparative Examples 1-3 and Example 1 employ a continuous flow stirred reactor having the configuration as illustrated in FIG. 1.

Referring to FIG. 1, the depicted apparatus consists of holding tank 1 which is filled with a liquid bath 5 comprising a 1:1 wt ratio of a methanol/water mixture for temperature control. Thermocouple 2 is immersed in the bath for measuring the temperature of the same. Stirrer 4 is also immersed in the bath to provide circulation of the same. Reaction vessel 6, equipped with stirrer 7, is also immersed in the bath. The reaction vessel consists of a cylindrical main body portion 24 and a jug handle portion 9. The contents of the reactor are circulated by the stirrer in an upward direction through the jug handle portion 9 and in a downward direction through main body portion 24. The jug handle portion is equipped with thermocouple 3 for temperature measurement of the contents of the reactor. Line 8 enters the top of the reactor for removal of product and analysis of the same by on-line gas chromatography. Gaseous catalyst is introduced into the reactor via line 10. A mixture of feedstock and catalyst promoter is introduced into the reactor via line 11. Product is removed from the reactor via line 13, which contains a check valve to prevent back-mixing of the quench medium. Quench medium can be introduced into line 13 via line 14 by opening valve 15. The material in line 13 passes through valve 16, which maintains backpressure and into line 17 where it enters collection vessel 18. Collection vessel 18 is equipped with stirring means 19, and a steam coil 20 with steam entry and exit lines 21 and 22 therefor. The heating coil is used to drive off unreacted $C_4$ monomer prior to analysis. Quench line 23 permits introduction of quench medium into collection vessel 18 to effectuate delayed quench by opening valve 25. The length of line 17 is 5 ft. and the length of line 13 after it exits the holding tank 1 is 1 inch. The inner diameter of lines 17 and 13 is 0.25 inch.

Because of the different polymerization times employed and the dependency of the polymerization time on the volume of the reactor 6, one of two different reactors can be employed, with reactor A having a volume of 300 ml and reactor B having a volume of 1750 ml. Moreover, it will be observed that transfer lines 13 and 17 are of fixed length. Consequently, at shorter polymerization times the polymer passing therethrough will travel at a faster rate than when employing longer polymerizations. Thus, the delay in the delayed quench procedure will not be as long for shorter polymerization times relative to longer polymerization times. Notwithstanding this fact, one is still able to observe a difference in results of the polybutene reactivity produced by immediate quench at longer reaction times relative to delayed quench at shorter reaction times. Such difference in results would be even more dramatic if the length of transfer lines 13 and 17 could be varied to achieve a constant period of delay for all the runs employing delayed quench.

In the following examples, isobutylene conversion and PIB yield are calculated as follows:

$$\% \text{ Conversion} = 100 - \left[ \frac{\% \text{ of unreacted isobutylene}}{\% \text{ of feed isobutylene}} \right] \times 100$$

$$\% \text{ Yield} = \left[ \frac{\text{Wt. of } PIB \text{ Produced*}}{\text{Wt. of isobutylene in feed}} \right] \times 100$$

*Wt. of $PIB$ Produced = $\frac{\text{Total polymer product}}{\text{excluding light ends}} \leq C_{24}$

COMPARATIVE EXAMPLES 1 to 3

The following three runs were conducted at average polymerization times of 4 minutes, 15 minutes, and 30 minutes using a delayed quench procedure. The feedstock employed in each run was as follows:

| Feedstock Composition wt % | | |
|---|---|---|
| isobutylene | 15 | |
| butene-1 | 14 | |
| cis-butene-2 | 8.5 | |
| trans-butene-2 | 6.5 | |
| isobutane | 53 | |
| n-butane | 3 | |
| butadiene | <0.5 | |
| density of feedstock | 0.577 at STP | g/ml |

The liquid feedstock was blnded with a promoter consisting of methanol such that the addition rate of the promoter to the reactor (through line 11) was as reported at Table 1 for each run to provide a $BF_3$: promoter mole ratio of about 200:1. The reactor was filled with feedstock and pressured with nitrogen. Polymer product was removed from the reactor at a rate equal to the feedstock addition rate and the average polymerization time polymerization time calculated based on the volume of reactor A or B, whichever reactor was employed and shown at Table 1, and the feedstock addition rate. $BF_3$ was fed to the reactor as a gas, and the addition rate thereof was varied slightly within the range shown at Table 1.

Polymer product produced during start up was discarded until process conditions were stabilized to a steady state. Polymer product was collected in vessel 18 and heated to a temperature of 100° C. with coil 20 while a quench solution of 5 wt. % NaOH and 10 wt. % methanol in water was continuously introduced into the same at a rate of about 20 ml/min. Valve 15 remained closed for all the comparative runs. Polymer samples were then removed, $\leq C_{24}$ light ends removed and the remaining product analyzed for percent conversion, percent yield, $\overline{M}_n$ (by gel permeation chromatography using a polyisobutylene standard which was calibrated by vapor phase osmometry), as well as by C-13-NMR for identification and quantification of double bond types.

Figure 2:
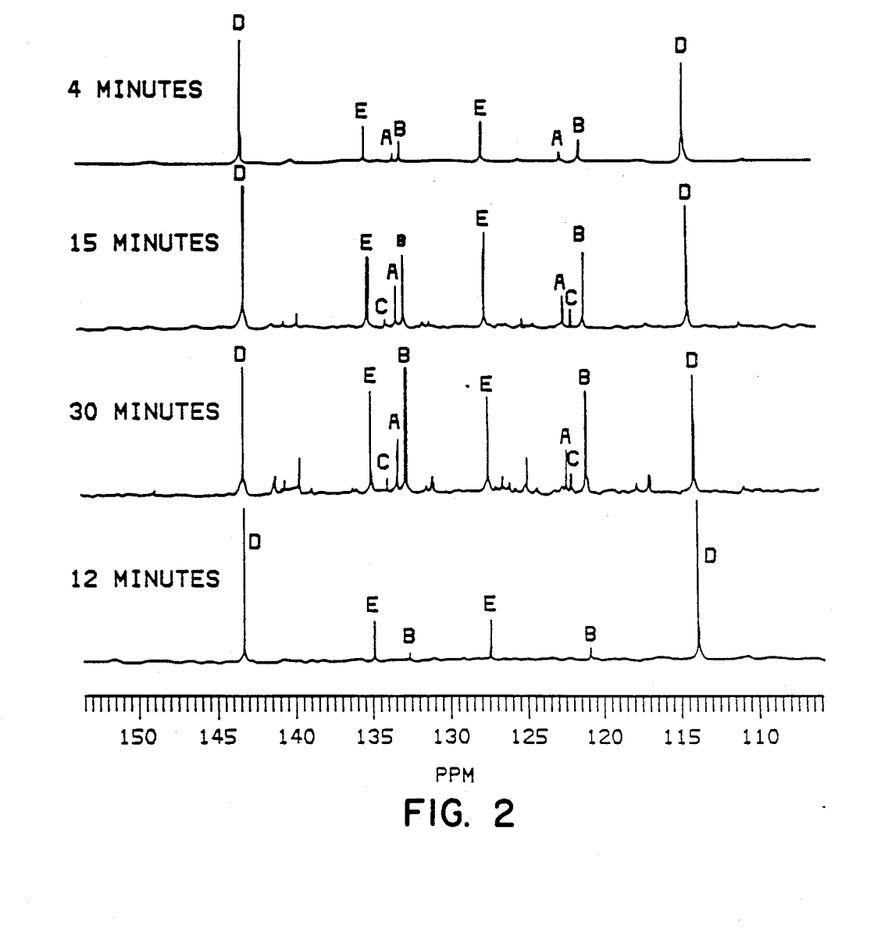
FIG. 2 depicts a partial Carbon-13-NMR spectra of polybutenes prepared in accordance with the Examples. The lettered peaks correspond to olefin double bond types also identified in the Examples. The height of the peaks reflect relative intensities of the olefin C-13 signal.

In addition, the pertinent portions of the NMR spectra for each run are provided at FIG. 2. The peaks of these spectra associated with each double bond type are labeled A through E as follows, which peaks occur at the chemical shifts indicated:

| | | C-13 NMR Chemical Shifts (PPM) |
|---|---|---|
| Structure A: | (structure) | 133.0, 122.2 |
| Structure B: | $R_3, R_1, R_4, R_2$ on C=C | 132.5, 120.8 |
| Structure C: | (structure) | 133.7, 121.8 |
| Structure D: | (structure) | 142.9, 114.0 |
| Structure E: | (structure) | 134.8, 127.3 |

The relative height of each peak so labeled is generally indicative of the relative proportion of each double bond type. Based on the total unsaturation content, the percent thereof in the form of the different double bond types detected is also reported at Table 2.

The C-13 NMR measurements were conducted as follows:

C-13 NMR spectra of the PIB's were obtained at 100 MHz using the JEOL GX 400 NMR spectrometer. Each PIB sample was dissolved in approximately 50 vol. percent $CDCl_3$. About 25 mg/ml. of Cr(III) (acetoacetate)$_3$ was added as a relaxation reagent. The pulse sequence consisted of a 45° pulse followed by a 0.4 second acquisition time and 1.6 second pulse delay. The proton decoupling field was gated on during acquisition and off during the pulse delay to suppress Overhauser enhancement. Spectra were run overnight, accumulating 27,000–28,000 scans. Quantification of each double bond type is determined by conventional techniques through integration of the areas under the pertinent peaks with reference to the total theoretical unsaturation content of the polybutene also determined by conventional techniques.

The results of Comparative Examples 1 to 3 are reported at Table 1; Runs 1 to 3 and of the NMR analysis at Table 2. (The NMR Spectra of Runs 1 to 3 is provided at FIG. 2.)

EXAMPLE 4

Using a feedstock having the composition as employed in Comparative Examples 1 to 3, a polybutene product was made in accordance with the procedures of Comparative Example 1 at an average polymerization time of 12 minutes with the exception that the quench medium was introduced into line 13, immediately upon exiting the reactor, at a rate of 10 ml/min and the quenched polymer collected in vessel 18 heated to the same temperature as in the Comparative Examples. The polymer was also contacted with additional quench medium from line 23 during the collection process. The product was analyzed as in the Comparative Examples and the process conditions and analysis results are reported at Tables 1 and 2 as Run 4. (The NMR spectrum of Run 4 is provided at FIG. 2.)

TABLE 1

| Run No. | Corresponding Ex. or Comp. Ex. No. | Addition Rate of Feedstock (mol/hr) | Addition Rate of BF$_3$ (mmoles/hr) | Addition Rate of Promoter (mmoles/hr) | Reaction Temp. (°C.) | Reaction Pressure (mm Hg) | Average Polymerization Time (minutes) | *Reactor Type (A or B) | Isobutylene Conversion (%) | PIB Yield (%) | PIB $M_n$ |
|---|---|---|---|---|---|---|---|---|---|---|---|
| 1 | Comp. Ex. 1 | 68.3 | 7.8 | 0.05 | −7.8 | 150 | 4 | A | 62.6 | 63 | 1260 |
| 2 | Comp. Ex. 2 | 66.8 | 15.4 | 0.09 | −9.5 | 150 | 15 | B | 76.1 | 87 | 1325 |
| 3 | Comp. Ex. 3 | 55.9 | 5.3 | 2.07 | 0 | 200 | 30 | B | 90 | 92 | 970 |
| 4 | Example 4 | 90.1 | 23.0 | 0.12 | −10 | 150 | 12 | B | 80.2 | 97 | 826 |

* Reactor A = 300 ml
Reactor B = 1750 ml

TABLE 2

Relative Percentage of Olefin Double Bond Types Present in PIB Produced in Runs 1 to 4

| Run No. | Average Polymerization Time (minutes) | D + E | Olefin Types*** A | B | C | D | E | Internal Disubstituted | Other |
|---|---|---|---|---|---|---|---|---|---|
| 1 | 4* | 77 | 4 | 10 | 2 | 59 | 18 | 3 | 4 |
| 2 | 15* | 49 | 8 | 14 | 2 | 32 | 17 | 3 | 23 |
| 3 | 30* | 34 | 8 | 16 | 2 | 18 | 16 | 3 | 37 |
| 4 | 12** | 78 | 0 | 3 | 0 | 64 | 14 | 0 | 19 |

* = delayed quench
** = immediate quench
*** = See description of FIG. 2 for identification of double bond types A to E.

Discussion of Results

Referring to FIG. 2, it can be seen that 4 minutes of reaction time using delayed quench, a substantial portion of the unsaturation content of the polymer is in the form of terminal disubstituted (Structure D), followed by terminal trisubstituted (Structure E) and then tetrasubstituted (Structure B).

As the polymerization time is increased to 15 minutes, the amount of terminal disubstituted double bond content increases slightly but at the same time, the tetrasubstiuted double bond content (Structure B) has also increased. The tetrasubstituted double bond content increases still further at 30 minutes polymerization time.

In contrast, Run 4 using immediate quench results in the highest terminal disubstituted double bond content while simultaneously achieving the lowest tetrasubstituted double bond content. In addition, internal trisubstituted double bond types (Structures A and C) have been eliminated in contrast to the polymers of Runs 1 and 3 which contain some of these structures. Note further the improvement in PIB yield and isobutylene conversion of Run 4.

An additional series of experiments were performed employing a nine liter stirred pilot plant reactor provided with a liquid inlet, a liquid outlet, and separate feed lines for direct injection of $BF_3$ gas into the reaction liquid. The reactor was also provided with a liquid level controller, and the temperature of the reaction liquid (sensed in the reaction liquid by a thermocouple) was controlled by means of a pump around cooler to which was fed a portion of the reactor product effluent liquid for cooling and return to the reaction zone. In each experiment, the selected isobutylene liquid feed was dried with molecular sieves to achieve the desired water level and was then continuously introduced into the reactor at the selected feed rate. The isobutylene feed was also characterized by a butadiene content of less than 1 ppm by weight. When employed as promoter, methanol was premixed with the isobutylene feed prior to the reactor. The liquid product stream was withdrawn from the reactor continuously and a portion was recycled through the pump around cooler to the reactor; the balance was withdrawn as a product stream at a rate sufficient to maintain the selected liquid reactor level and to provide the predetermined liquid hold-up (viz, residence time) in the reactor.

In Comparative Examples 5 and 7, which represent delayed quenching, 100 gms of the reaction liquid were withdrawn from the reactor and injected into a clean, dry sample bomb which was at room temperature. After 30 minutes, the reaction sample is evacuated from the sample bomb into a jar containing 20 gms of methanol (at room temperature) to quench the catalyst.

In Examples 6 and 8 (which are illustrative of the immediate quenching feature of the present invention, 100 gms of the reaction liquid were withdrawn from the reactor and injected into a clean, dry sample bomb which contained 20 gms of methanol (at room temperature) to quench the catalyst.

In Comparative Example 9, immediate quenching by the method employed in Examples 6 and 8 was used.

The data thereby obtained are summarized in Table 3 below.

From the data in Table 3 it can be seen that the immediate quench in Example 6 provided substantially improved terminal olefin content, as compared to the delayed quench of Comparative Example 5, when high isobutylene conversions are achieved (80%). In contrast, immediate quench in Comparative Examples 7 and 9 did not provide an improved terminal olefin content in the polymer at isobutylene conversions of 45 and 61% (compared to the delayed quench runs in Comparative Examples 8 and 10, respectively).

The principles, preferred embodiments, and modes of operation of the present invention have been described in the foregoing specification. The invention which is intended to be protected herein, however, is not to be construed as limited to the particular forms disclosed, since these are to be regarded as illustrative rather that restrictive. Variations and changes may be made by those skilled in the art without departing from the spirit of the invention.

What is claimed is:

1. A process for the preparation of a polybutene having a number average molecular weight ($\overline{M}_n$) of from about 500 to about 5,000 and a total terminal double bond content of at least 40%, based on the total theoretical unsaturation of the polybutene, said polybutene containing at least 50% by weight isobutylene units based on the polybutene $\overline{M}_n$ which comprises:

(1) contacting a feed comprising at least 10% by weight isobutylene, based on the weight of the feed, with a $BF_3$ catalyst in a manner and under conditions sufficient to cationically polymerize said feed in the liquid phase to form said polybutene, said polymerization being conducted in the presence of a catalyst promoter (a) at an average polymerization time of from 12 to about 40 minutes, (b) at a ratio of millimoles of $BF_3$ to moles of isobutylene in the feed of from about 0.1:1 to about 5:1, and (c) to an isobutylene conversion of at least about 70%; and (2) immediately quenching the polybutene product with a quench medium sufficient to deactivate said $BF_3$ catalyst.

2. The process of claim 1 wherein the isobutylene conversion is from about 75 to 99%.

3. The process of claims 1 or 2 wherein the average polymerization time is from about 15 to about 30 minutes.

4. The process of claims 1 or 2 wherein immediate quench is conducted on the polybutene product what is at the polymerization temperature.

5. The process of claims 1 or 2 wherein said catalyst promoter comprises at least one member selected from the group consisting of water, alcohol, carboxylic acid, acid anhydride, HF, ether and mixtures thereof.

6. The process of claims 1 or 2 wherein the feed comprises between about 10 and 40% butene-1, between about 10 and 40% butene-2, between about 40 and 60% isobutane, between about 4 and 10% n-butane, and up to about 0.5% butadiene, said percentages being by weight, based on the weight of the feed.

TABLE 3

| Example | $BF_3$ (gms/hr) | i-$C_4$= (wt. %) | Promoter (vol. ppm) $H_2O$ | Promoter (vol. ppm) $CH_3OH$ | Feed Temp. (°C.) | Reactor Temp. (°C.) | Reactor Press. kPg | Residence Time (min) | i-$C_4$ % Conversion | PIB $M_n$ | Terminal Olefin (%) | Quench Type |
|---|---|---|---|---|---|---|---|---|---|---|---|---|
| Comp. Ex. 5 | 6.0 | 21 | 142 | 0 | 5 | −3 | 400 | 22 | 80 | 528 | 40 | Delayed |
| Example 6 | 6.0 | 21 | 142 | 0 | 5 | −3 | 400 | 22 | 80 | 528 | 48 | Immediate |
| Comp. Ex. 7 | 7.5 | 23 | 35 | 0 | 5 | −6 | 400 | 22 | 45 | 1500 | 40 | Delayed |
| Comp. Ex. 8 | 7.5 | 23 | 35 | 0 | 5 | −6 | 400 | 22 | 45 | 1500 | 35 | Immediate |
| Comp. Ex. 9 | 6.6 | 32 | 15 | 40 | 6 | 0 | 400 | 15 | 61 | 1472 | 57 | Delayed |
| Comp. Ex. 10 | 6.6 | 32 | 15 | 40 | 6 | 0 | 400 | 15 | 61 | 1389 | 56 | Immediate |

7. The process of claims 1 or 2 wherein the polymerization reaction is conducted in the presence of a catalyst promoter added separately from the polymerization catalyst to the polymerization zone in which the polymerization reaction is conducted.

8. The process of claims 1 or 2 wherein the ratio of mmoles of $BF_3$ to moles of isobutylene in the feed is from about 0.3:1 to about 4:1.

9. The process of claims 1 or 2 wherein the polymerization reaction is conducted to achieve an a isobutylene conversion of from about 80 to about 98%.

10. The process of claims or 2 wherein the polymerization reaction is conducted to achieve a polybutene having a terminal disubstituted double bond content of at least 18%, and a total terminal double bond content of at least about 45%.

11. The process of claims 1 or 2 wherein the feed consists essentially of olefin monomers containing 4 carbon atoms.

12. The process of claims 1 or 2 wherein the polymerization reaction is conducted at a temperature of from about $-20°$ to about $+25°$ C.

13. The process of claims 1 or 2 wherein the molecular weight distribution of the polybutene is controlled to be from about 1.5 to about 2.5.

14. The process of claims 1 or 2 wherein the average polymerization time is from about 15 to about 30 minutes.

15. The process of claims 1 or 2 wherein the average polymerization time is from about 20 to about 30 minutes.

16. The process of claims 1 or 2 wherein said immediate quench is conducted on polybutene which has not been suojected to isomerization suppression temperatures of less than $-25°$ C.

17. A process for the preparation of a polybutene having a number average molecular weight ($\overline{M}_n$) of from about 500 to about 5,000 and a total terminal double bond content of at least 40%, based on the total theoretical unsaturation of the polybutene, said polybutene containing at least 50% by weight isobutylene units based on the polybutene $\overline{M}_n$ which comprises;
  (1) contacting a feed comprising at least 10% by weight isobutylene, based on the weight of the feed, with a $BF_3$ catalyst in a manner and under conditions sufficient to cationically polymerize said feed in the liquid phase to form said polybutene, said polymerization being conducted in the presence of a catalyst promoter (a) at an average polymerization time of from 12 to about 40 minutes, (b) at a ratio of millimoles of $BF_3$ to moles of isobutylene in the feed of from about 0.1:1 to about 5:1, (c) at a polymerization temperature of from about $-20°$ to about $+25°$ C., and (d) to an isobutylene conversion of at least about 70%; and
  (2) immediately quenching the polybutene product before the temperature of said product exceeds by about 2° C. the highest polymerization temperature employed with a quench medium sufficient to deactivate said $BF_3$ catalyst.

18. The process of claim 17 wherein the isobutylene conversion is from about 75 to 99%.

19. The process of claim 18 wherein the average polymerization time is from about 15 to about 30 minutes.

20. The process of claim 17 wherein said catalyst promoter comprises at least one member selected from the group consisting of water, alcohol, carboxylic acid, acid anhydride, HF, ether and mixtures thereof.

21. The process of claim 17 wherein the feed comprises between about 10 and 40% butene-1, between about 10 and 40% butene-2, between about 40 and 60% isobutane, between about 4 and 10% n-butane, and up to about 0.5% butadiene, said percentages being by weight, based on the weight of the feed.

22. The process of claim 17 wherein the polymerization reaction is conducted in the presence of a catalyst promoter added separately from the polymerization catalyst to the polymerization zone in which the polymerization reaction is conducted.

23. The process of claim 17 wherein the ratio of moles of $BF_3$ to moles of isobutylene in the feed is from about 0.3:1 to about 4:1.

24. The process of claim 17 wherein the polymerization reaction is conducted to achieve an isobutylene conversion of from about 80 to about 98%.

25. The process of claim 17 wherein the polymerization reaction is conducted to achieve a polybutene having a terminal disubstituted double bond content of at least 18%, and a total terminal double bond content of at least about 45%.

26. The process of claim 17 wherein the feed consists essentially of olefin monomers containing 4 carbon atoms.

27. The process of claim 17 wherein the molecular weight distribution of the polybutene is controlled to be from about 1.5 to about 2.5.

28. The process of claim 17 wherein the average polymerization time is from about 15 to about 30 minutes.

29. The process of claim 28 wherein the average polymerization time is from about 20 to about 30 minutes.

30. The process of claim 17 wherein said immediate quench is conducted on polybutene which has not been subjected to isomerization suppression temperatures of less than $-25°$ C.

* * * * *